(12) United States Patent
Kirker et al.

(10) Patent No.: US 6,805,805 B2
(45) Date of Patent: Oct. 19, 2004

(54) SYSTEM AND METHOD FOR RECEPTACLE WALL VIBRATION IN A CENTRIFUGE

(75) Inventors: Curtis Kirker, Kamuela, HI (US); Berkeley F. Fuller, Kamuela, HI (US)

(73) Assignee: Phase Inc., Kamuela, HI (US)

(*) Notice: Subject to any disclaimer, the term of this patent is extended or adjusted under 35 U.S.C. 154(b) by 62 days.

(21) Appl. No.: 10/217,734

(22) Filed: Aug. 13, 2002

(65) Prior Publication Data

US 2003/0034314 A1 Feb. 20, 2003

Related U.S. Application Data

(60) Provisional application No. 60/312,324, filed on Aug. 13, 2001.

(51) Int. Cl.$^7$ .................. B01D 17/038; B01D 21/26; B04B 1/04; B04B 1/12; B04B 7/12
(52) U.S. Cl. .............. 210/781; 210/232; 210/360.1; 210/377; 210/380.1; 210/388; 210/785; 494/36; 494/37; 494/44; 494/47; 494/55; 494/60; 494/82
(58) Field of Search .................. 210/232, 360.1, 210/377, 380.1, 388, 781, 785; 494/36, 37, 44, 47, 56, 60, 82

(56) References Cited

U.S. PATENT DOCUMENTS

| | | |
|---|---|---|
| 2,028,168 A | 1/1936 | Roberts |
| 2,538,529 A | 1/1951 | Komline |
| 2,688,437 A | 9/1954 | Monnet |
| 3,327,401 A | 6/1967 | Stamos et al. |
| 3,937,317 A | 2/1976 | Fleury, Jr. |
| 3,960,318 A | 6/1976 | Dahlberg |
| 3,967,778 A | 7/1976 | Hunwick |
| 3,977,515 A | 8/1976 | Lewoczko |
| 4,005,817 A | 2/1977 | Charlton |
| 4,015,773 A | 4/1977 | Thylefors |

(List continued on next page.)

FOREIGN PATENT DOCUMENTS

| | | | |
|---|---|---|---|
| DE | 1 632 324 | 10/1970 | ............ B04B/3/20 |
| EP | 0346056 | 12/1989 | ............ B04B/1/08 |
| FR | 870540 | 3/1942 | ..................... 14/6 |
| FR | 1 038 726 | 10/1953 | ....................... 5/5 |
| JP | 2001-113204 | 10/1999 | |
| JP | 2001113204 A * | 4/2001 | ............ B04B/1/02 |
| WO | WO 00/02663 | 1/2000 | ............ B04B/1/00 |
| WO | 02/42004 A1 | 5/2002 | .......... B04B/15/06 |

OTHER PUBLICATIONS

English Abstract from the Patent Abstracts of Japan along with a Machine Translation of the rest of the specification of Japanese Patent Publication No. JP 2001113204 A was published on Apr. 2001.*
International Search Report PCT/US 99/15891, 6 pages.
International Search Report PCT/US 02/36830, 8 pages.
Search Report from PCT US 02/13186, Sep. 10, 2002.

Primary Examiner—David A. Reifsnyder
(74) Attorney, Agent, or Firm—Baker Botts L.L.P.

(57) ABSTRACT

A system and method for receptacle wall vibration in a centrifuge is disclosed. A centrifuge for removing more dense material from a fluid medium includes a vibratory device associated with the receptacle wall to create a vibratory force.

2 Claims, 12 Drawing Sheets

U.S. PATENT DOCUMENTS

| | | | |
|---|---|---|---|
| 4,067,494 A | 1/1978 | Willus | |
| 4,070,290 A | 1/1978 | Crosby | 210/91 |
| 4,103,822 A | 8/1978 | Stroucken | |
| 4,251,023 A | 2/1981 | Hohne | |
| 4,298,162 A | 11/1981 | Hohne | |
| 4,311,270 A | 1/1982 | Hovstadius | |
| 4,331,270 A | 5/1982 | Humlong | |
| 4,343,431 A | 8/1982 | Wehling | |
| 4,375,870 A | 3/1983 | Bodelson | 494/40 |
| 4,379,976 A | 4/1983 | Pitchford | 310/83 |
| 4,381,849 A | 5/1983 | Conant | 494/43 |
| 4,430,221 A | 2/1984 | Spiewok | 210/380.1 |
| 4,504,262 A | 3/1985 | Forsberg | 494/53 |
| 4,505,697 A | 3/1985 | Lee et al. | 494/35 |
| 4,519,496 A | 5/1985 | Ludvegsen | 198/676 |
| 4,569,761 A | 2/1986 | Spiewok et al. | 210/380.1 |
| 4,581,896 A | 4/1986 | Andresen | 60/487 |
| 4,629,564 A | 12/1986 | Pinato | |
| 4,643,709 A | 2/1987 | Lee et al. | 494/37 |
| 4,698,053 A | 10/1987 | Stroucken | 494/70 |
| 4,701,158 A | 10/1987 | Inge et al. | 494/74 |
| 4,710,159 A | 12/1987 | Gullers | 494/27 |
| 4,721,505 A | 1/1988 | Inge et al. | 494/74 |
| 4,729,759 A | 3/1988 | Krook | 494/4 |
| 4,784,634 A | 11/1988 | Schiele | 494/56 |
| 4,813,923 A | 3/1989 | Johansson | 494/48 |
| 4,820,256 A | 4/1989 | Nordstrom | 494/3 |
| 4,840,612 A | 6/1989 | Pallmar | 494/1 |
| 4,861,329 A | 8/1989 | Borgstrom et al. | 494/67 |
| 4,978,331 A | 12/1990 | Luchetta | 494/37 |
| 5,045,049 A | 9/1991 | Lantz | 494/70 |
| 5,052,996 A | 10/1991 | Lantz | 494/68 |
| 5,197,939 A | 3/1993 | Cederkvist et al. | 494/53 |
| 5,202,024 A | 4/1993 | Andersson et al. | |
| 5,244,584 A | 9/1993 | Schlieperskoetter | 210/787 |
| 5,362,292 A | 11/1994 | Borgstrom et al. | 494/74 |
| 5,374,234 A | 12/1994 | Madsen | 494/53 |
| 5,380,434 A | 1/1995 | Paschedag | |
| 5,397,471 A | 3/1995 | Rodebush | |
| 5,429,581 A | 7/1995 | Michaud | 494/54 |
| 5,601,522 A | 2/1997 | Piramoon | 156/172 |
| 5,759,744 A | 6/1998 | Brueck et al. | 430/312 |
| 6,033,564 A | 3/2000 | Kirker et al. | |
| 6,149,572 A | 11/2000 | Knelson | |
| 6,248,053 B1 * | 6/2001 | Ehnstrom et al. | 494/56 |
| 6,312,610 B1 | 11/2001 | Kirker et al. | 210/781 |
| 6,322,698 B1 | 11/2001 | Rios et al. | 210/321.75 |

* cited by examiner

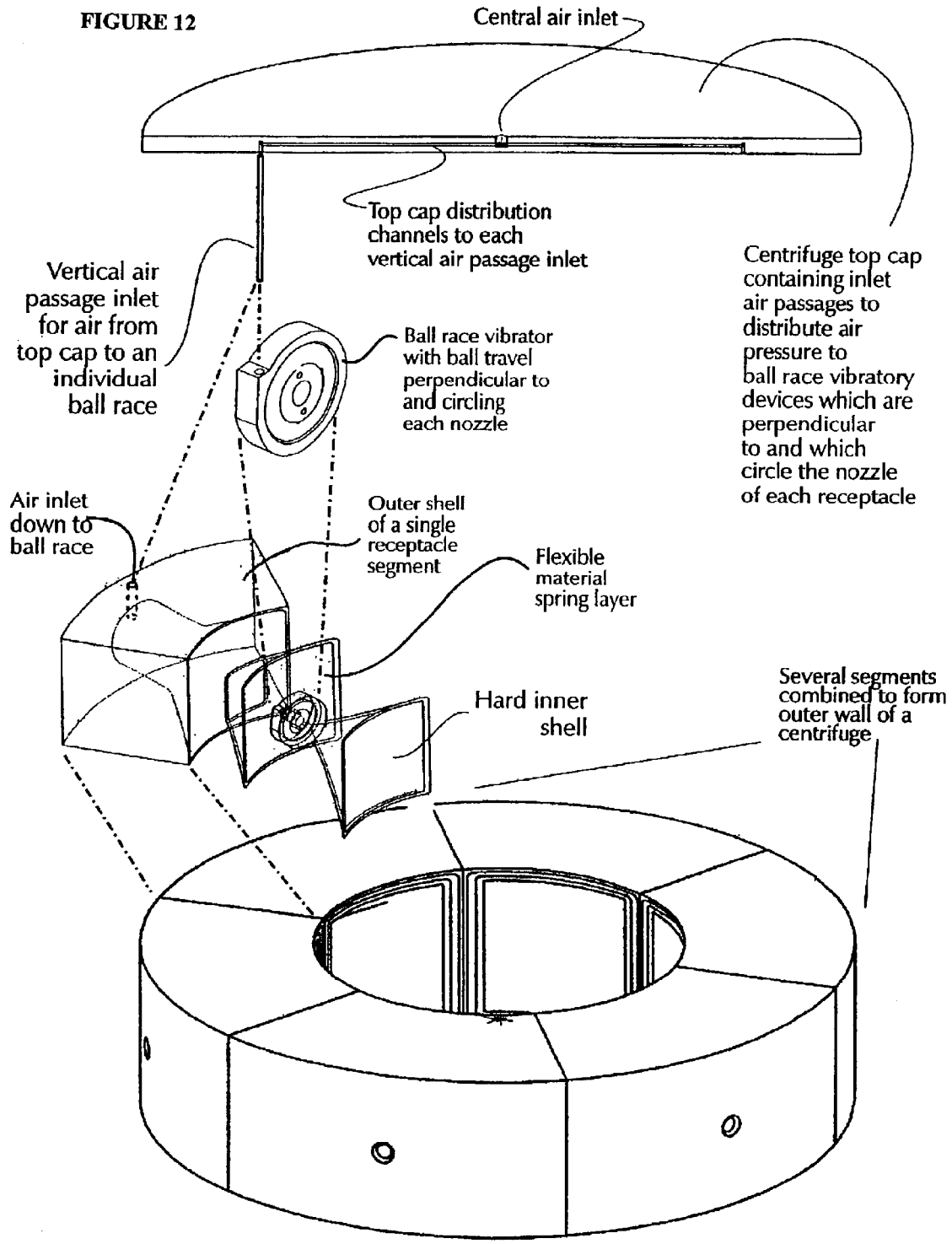

SYSTEM AND METHOD FOR RECEPTACLE WALL VIBRATION IN A CENTRIFUGE

CROSS REFERENCE TO RELATED APPLICATION

This application claims priority from U.S. Provisional Patent Application Ser. No. 60/312,324 filed Aug. 13, 2001, and entitled "Receptacle Wall Vibration in a Centrifugal Device to Enable Additional or Enhanced Separation and/or De-watering."

TECHNICAL FIELD OF THE INVENTION

This disclosure relates in general to the field of centrifugal separators, and more particularly to a system and method for receptacle wall vibration in a centrifuge.

BACKGROUND OF THE INVENTION

Prior art of the inventors claims the use of receptacles or hoppers to form most of the outer wall of a centrifugal device (allowed U.S. Pat. No. 6,033,564, Pending 09/115/527, and PPA 6/286,745).

The function of these receptacles is to: (1) continuously collect the heavy materials thrown outwards from the center of a centrifugal device; (2) channel and direct these collected heavy materials outward towards and through openings that perforate a centrifuge's outer wall; and (3) by use of various kinds of shapes, slopes and angles in the walls of the receptacles (PPA 6/286,745), cause the heavy materials to become increasingly compressed and compacted, due to centrifugal force driving them into the ever more confined volume formed by inward sloping receptacle walls converging to the outlet, which is an opening or a nozzle.

SUMMARY OF THE INVENTION

Sequence of Effects with Vibration Added to Centrifugal Force and Wall Compression This invention is an improvement to any centrifugal device which achieves liquid/solid separation by spinning a fluid, which fluid may be comprised of a liquid, a liquid-liquid mixture, a gas or a liquid-gas mixture. The centrifugal force achieved by spinning drives the heavier materials outwards from the device's center, where such heavier materials contact the sloped and converging walls of collecting receptacles leading to exit outlets or nozzles. These heavier materials may be hard or soft solids, or they may be gelatinous or viscous materials contained in the fluid. The centrifugal force tends to propel such heavier materials from the fluid and outwards into the ever-smaller volume created by the converging and narrowing walls of the receptacles.

However, when the outbound materials strike and land on the inwardly sloping walls of the receptacles, friction against these walls tends to oppose and restrict their continuing and further outward movement. To the degree that these materials thus stick on the sloped walls, their continued outward movement and compression in the ever narrowing outermost zone is impeded.

Causing the receptacle walls to vibrate interferes with this friction between the walls and the outwardly thrown heavier materials, i.e., shears the frictional bond between them, and thus enables their continued and additional outward movement and thus additional compression of them. The added compression thus enabled by applying vibration to the receptacle walls further increases separation of various sorts of heavier materials from a fluid and/or yields removed solids from said fluid which are significantly drier due to the more thorough removal of the liquid portions depending on the process goal.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

(Reciprocating Vibration—Powered at Each Receptacle)

(Reciprocating Vibration Powered from a Single Source for Two or More Receptacles)

Figure 1:
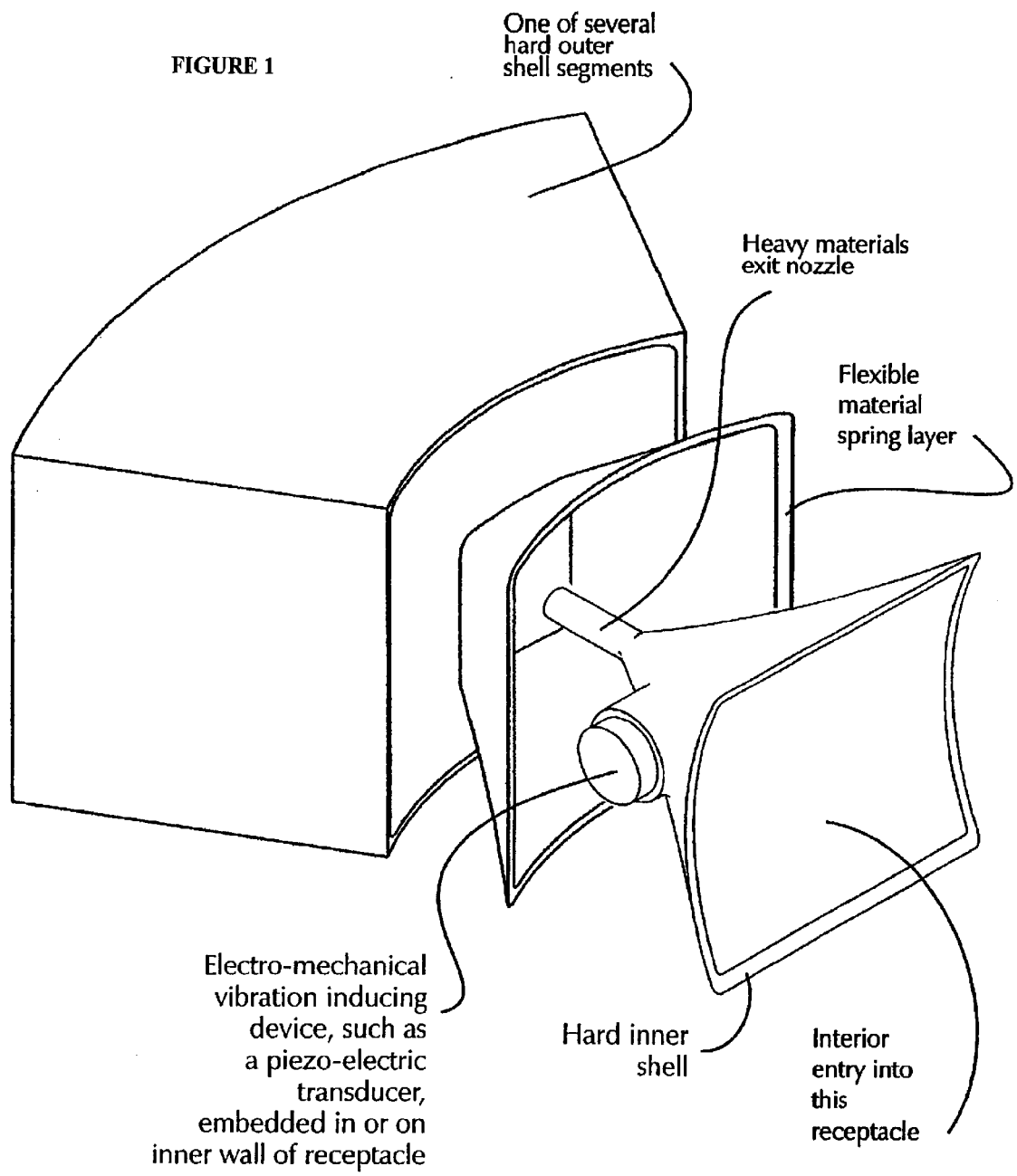
FIG. 1 Perspective view of an embodiment of a single receptacle, showing a hard-material outer shell, a flexible and/or compressible middle layer, and a hard inner shell. The compressible middle layer serves as a spring allowing the inner shell of the receptacle assembly leeway to vibrate in various directions. This embodiment, using a compressible or flexible middle liner is but one of many ways to permit vibration of a rigid inner liner or shell. Also shown is an electro-mechanical transducer element, such as a piezo-electric crystal, embedded in or on the inner receptacle shell wall, for the purpose of powering or inducing its vibration.
Figure 2:
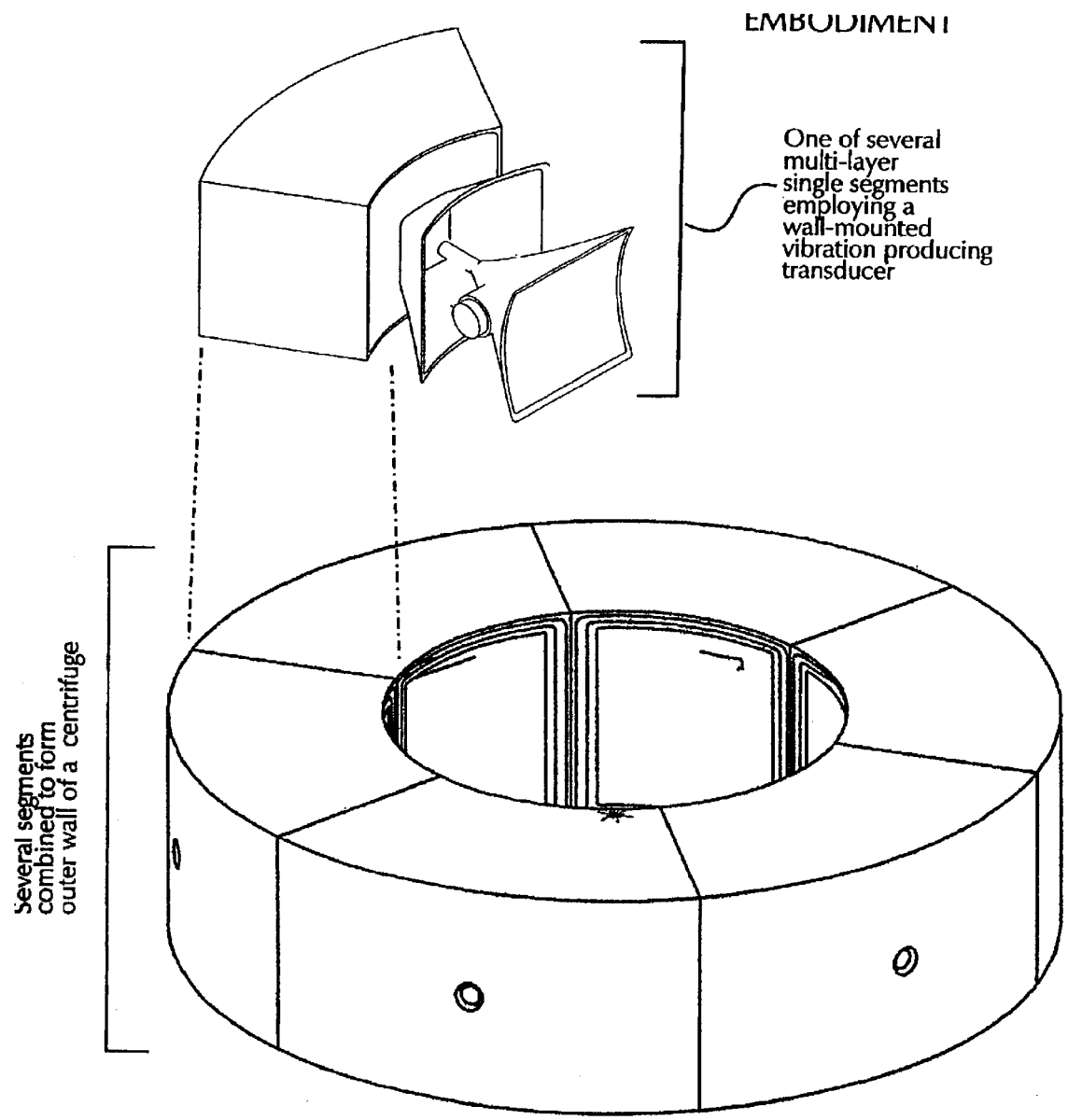
FIG. 2 Perspective view of drawing 01/12, showing that single receptacle assembly in relation to multiple other assemblies combined to form a complete outer wall of a centrifugal device.
Figure 3:
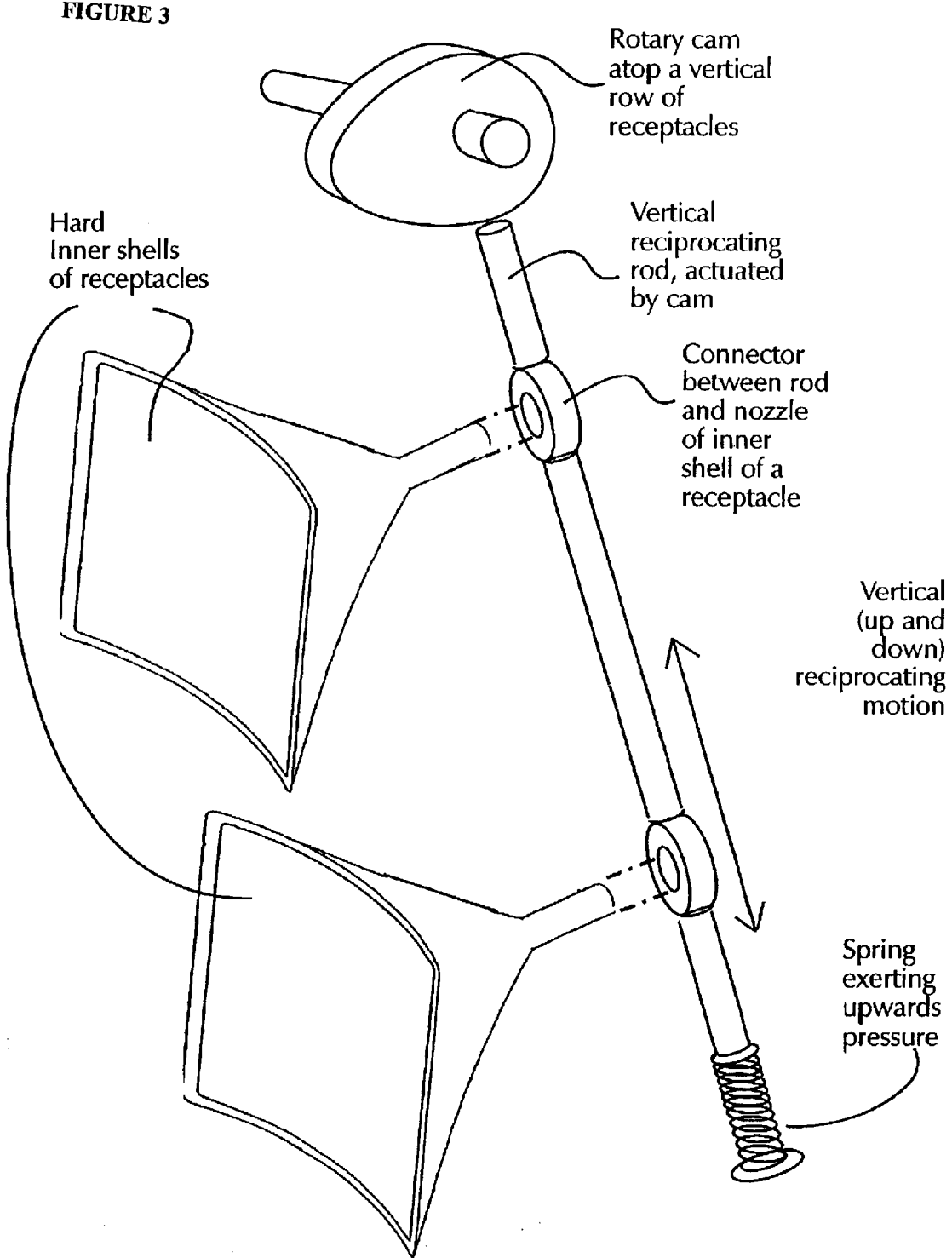

FIG. 3 Perspective view of a vertical series of several receptacles, with a vertical rod element connecting the outer wall openings of the inner shell of each 3-layer receptacle wall assembly to a single top or bottom mounted mechanical cam, with a spring at the end of the rod opposite the cam, such that the cam's rotation moves the rod up and down, connected to the outer openings of each inner wall shell and thereby reciprocally vibrating all of these shells from a centralized source of vibration.

(Torsional or Orbital Vibration Powered from a Single Source for Two or More Receptacles)

Figure 4:
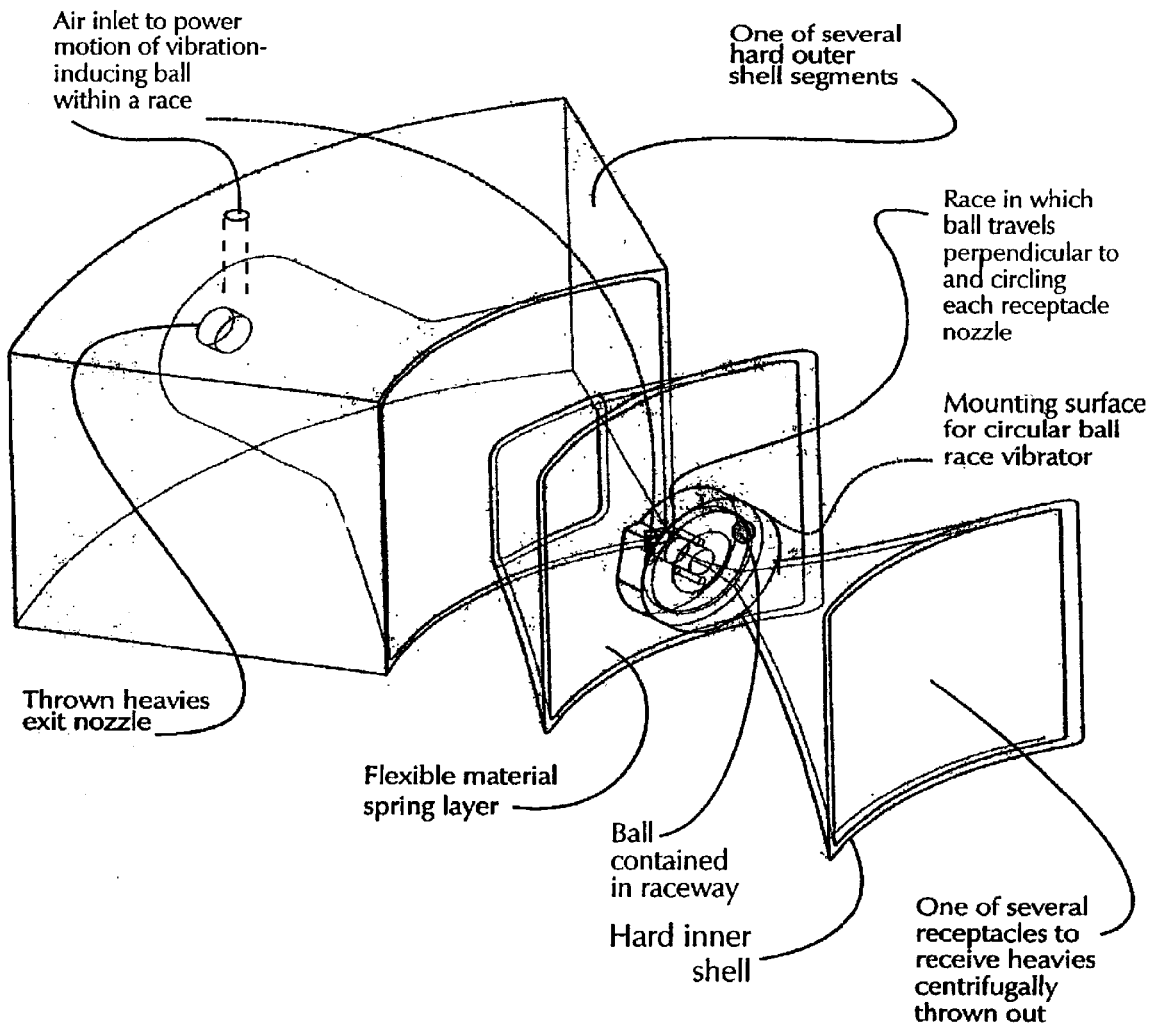

FIG. 4 Perspective exploded x-ray view of an embodiment of a single receptacle, showing a hard-material outer shell, a flexible middle layer, and a hard inner shell. The flexible middle layer permits the inner shell of the wall assembly to vibrate freely, while the hard outer shell is not vibrated. This embodiment, using a compressible or flexible middle liner is but one of many ways to permit vibration of a rigid inner liner or shell. The inner shell pictured here shows inward sloping surfaces converging to an exterior opening. An attachment surface forms part of the exterior opening end of this inner shell, where an individual vibration-inducing device can be mounted as a means for inducing torsional or orbital vibration to the inner shell.

Figure 5:
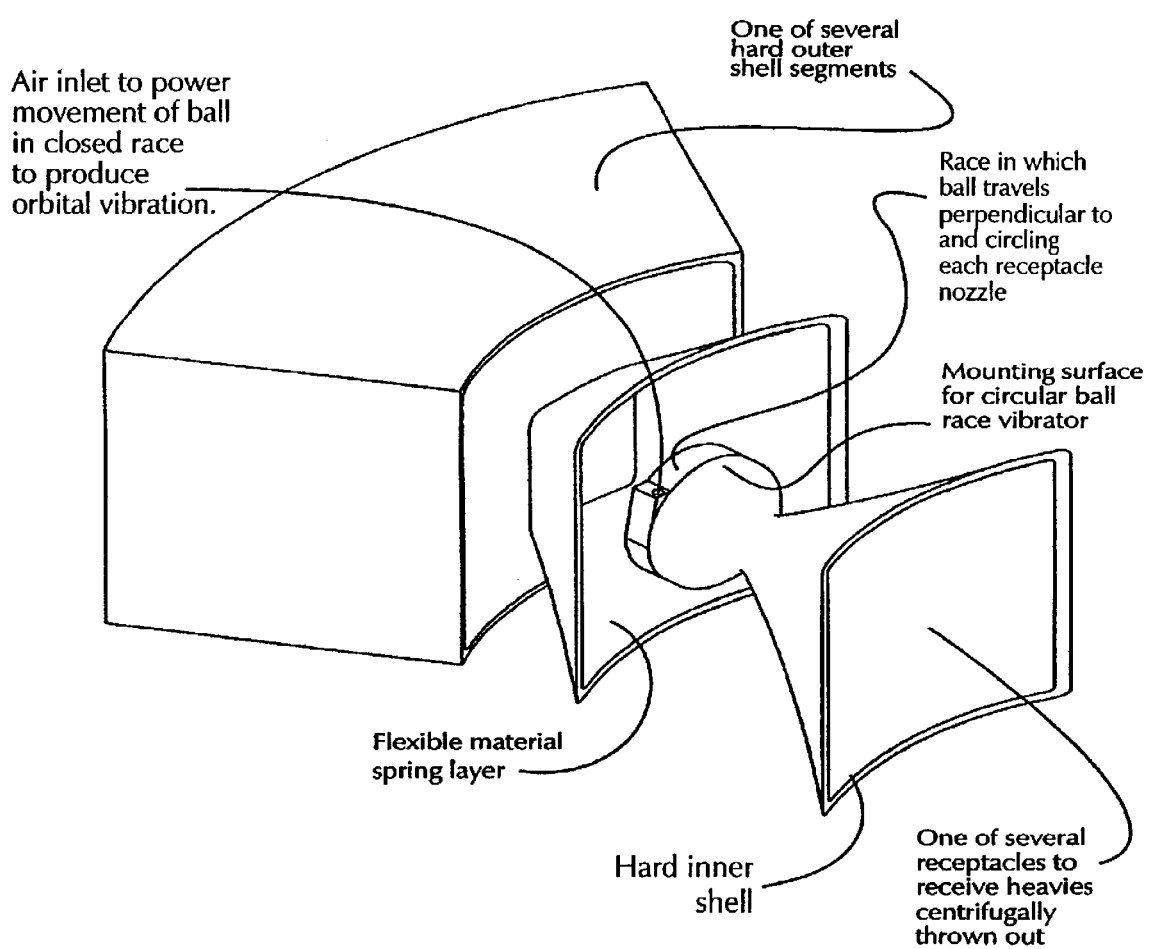

FIG. 5 Perspective exploded view only of the exterior of FIG. 4, an embodiment of a single receptacle, with a hard-material outer shell, a flexible or spring-like middle layer, and a hard inner shell, and a ball-race vibration-inducing device perpendicular to and circling the exterior opening.

Figure 6:
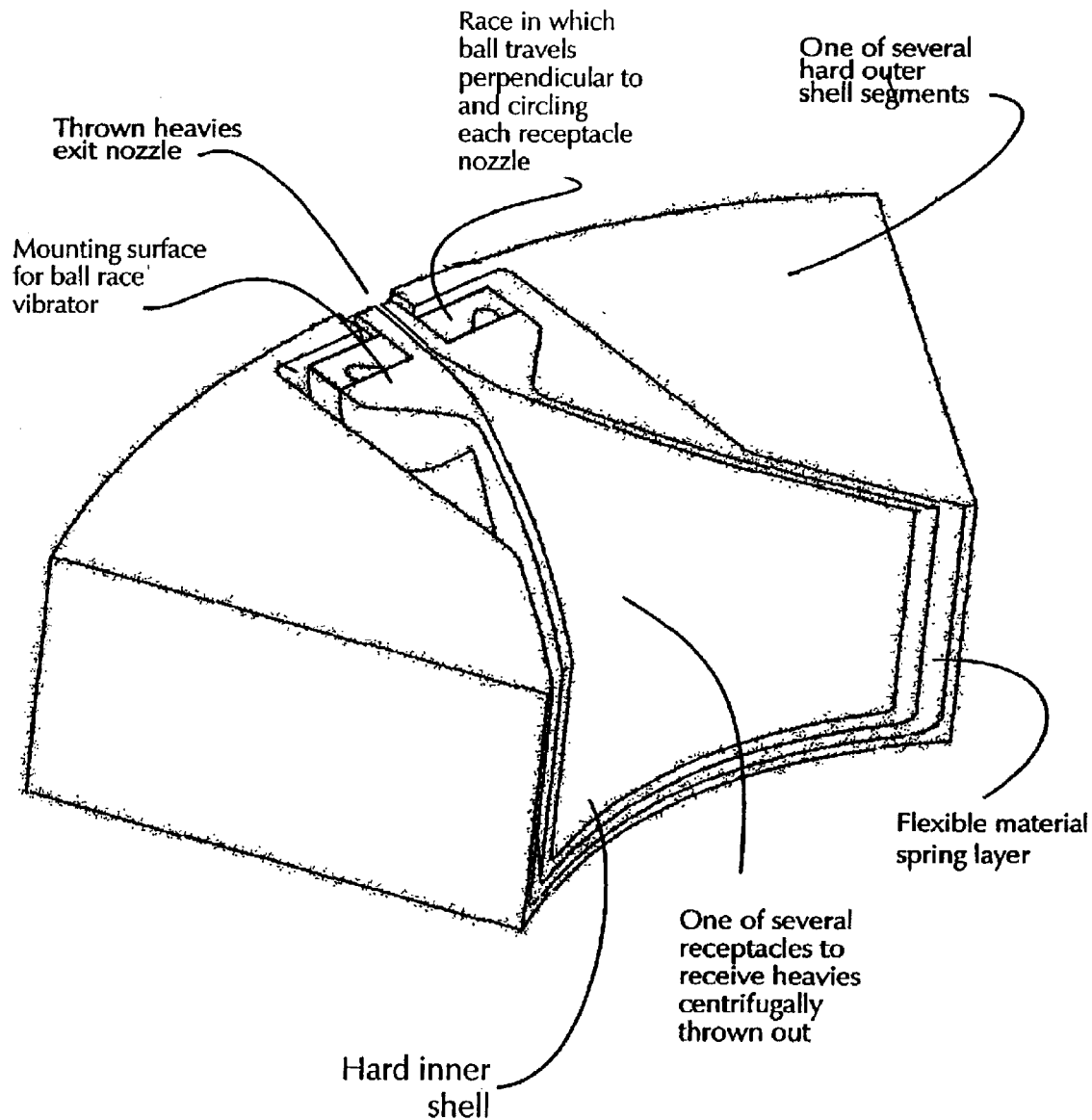

FIG. 6 Assembled cut-away view of same perspective view as FIG. 4 (top half removed), showing same details.

Figure 7:
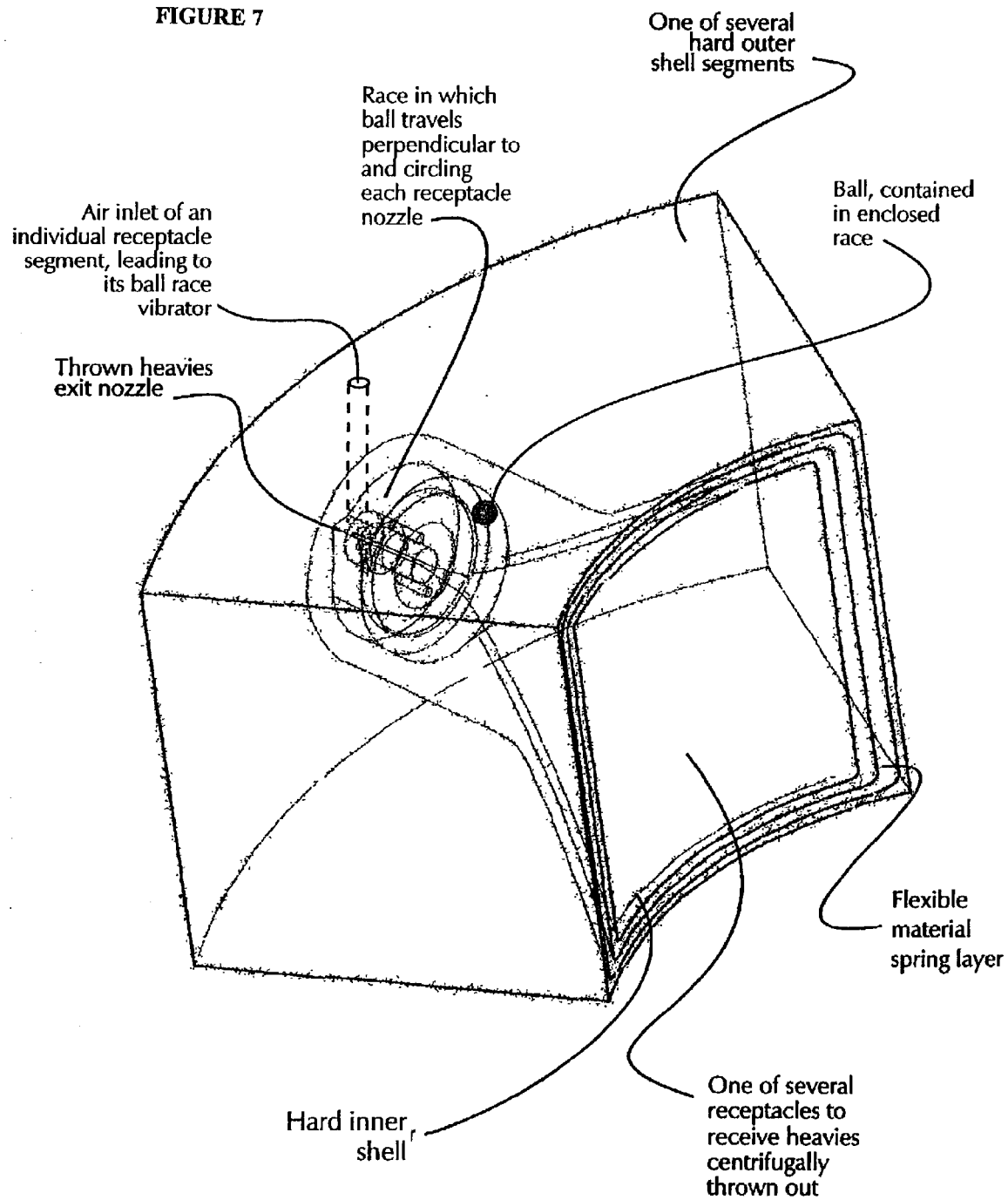

FIG. 7 X-ray perspective view of assembled single three-layer receptacle segment, comprising a hard-material outer shell, a flexible or spring-like middle layer, and a hard inner shell, and a ball race vibration-inducing device perpendicular to and circling the exterior opening.

Figure 8:
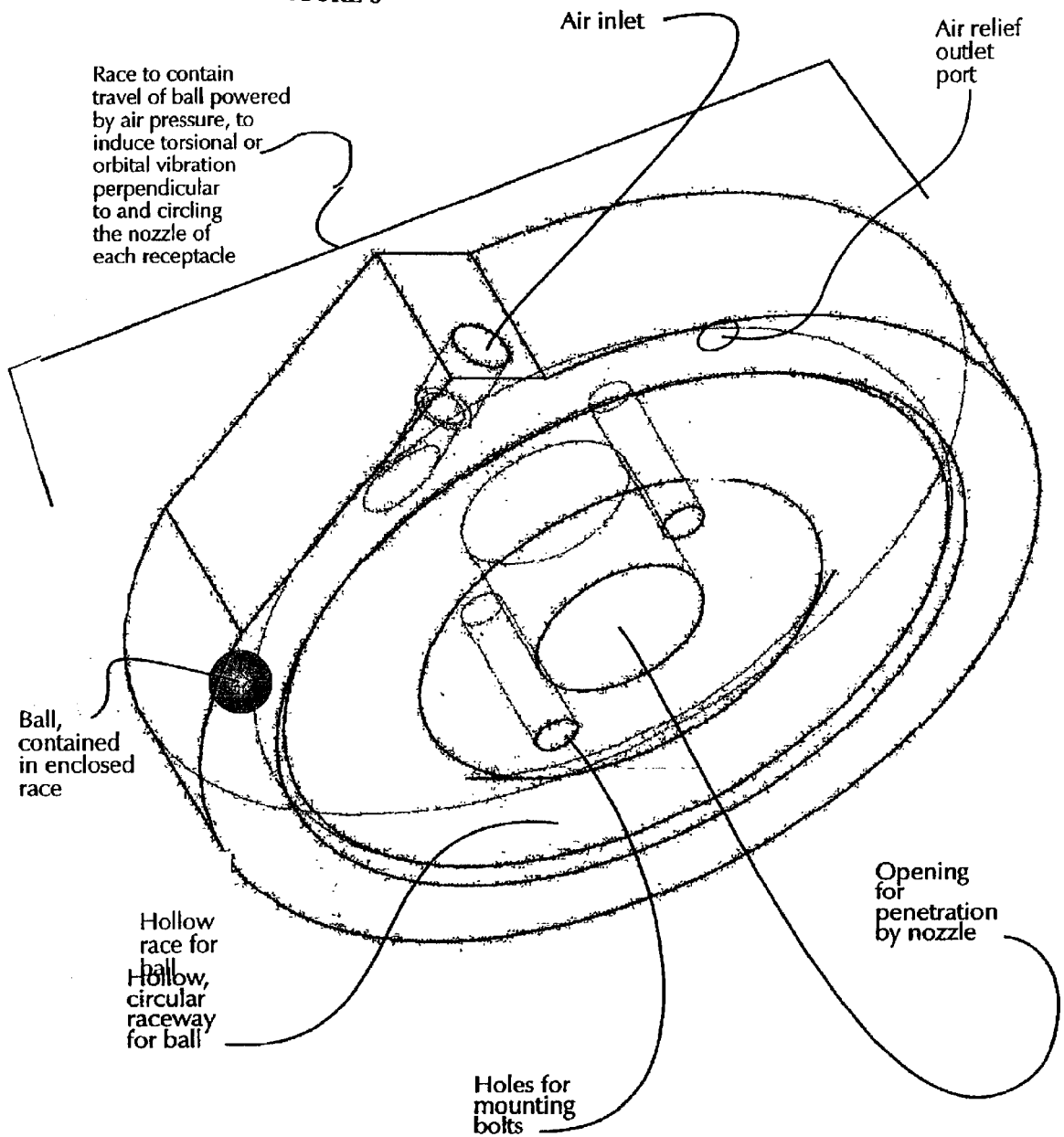

FIG. 8 X-ray perspective and enlarged view of torsional or orbital vibration-inducing part, consisting of an enclosed path or race, an air inlet, one or more air relief outlet ports, a ball which travels through the path propelled by the injected air, and mounting bolt holes.

Figure 9:
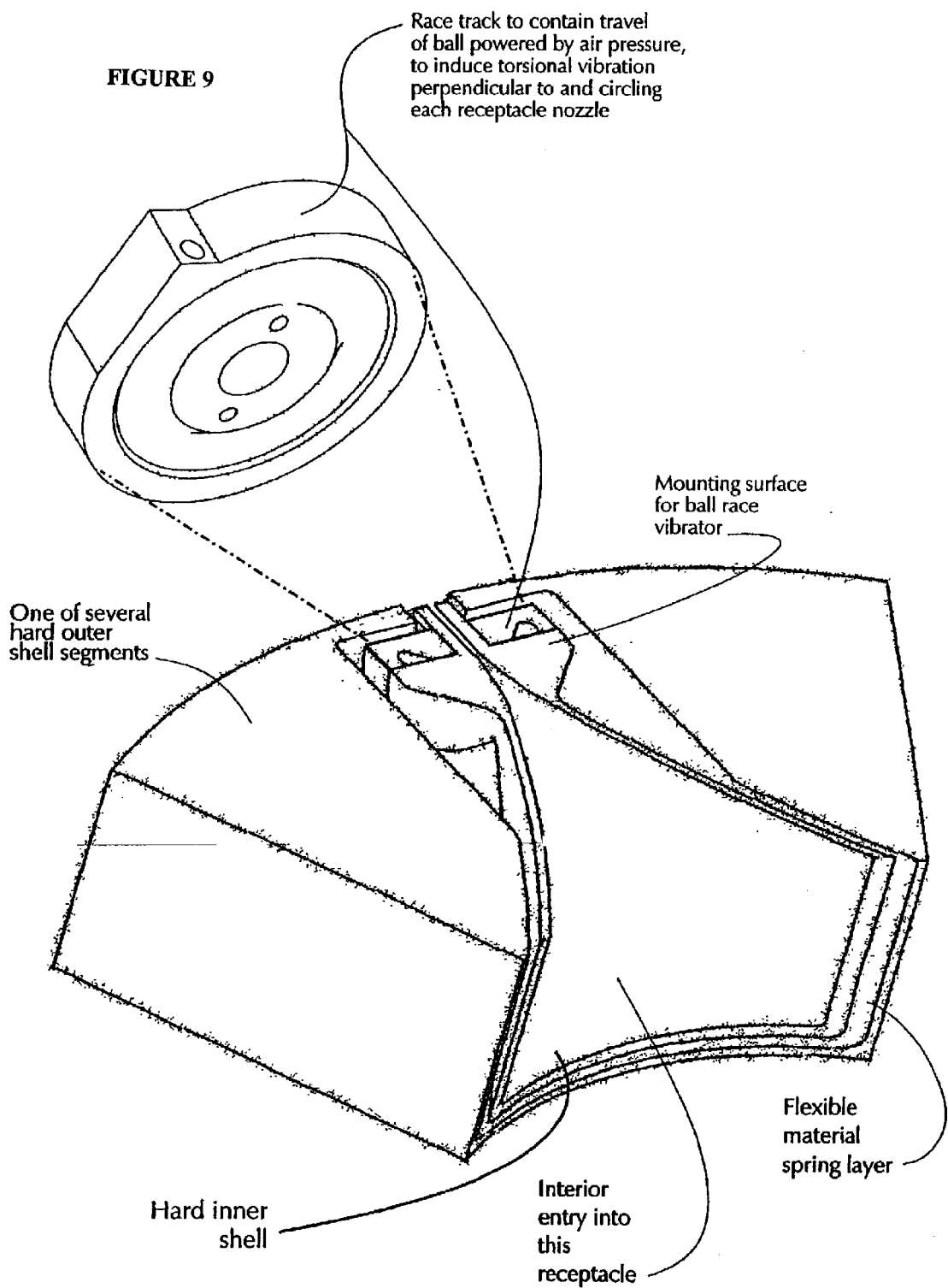

FIG. 9 Exploded and partial cut-away view of the lower half of an assembled three-layer individual receptacle segment, showing mounting method for a ball race vibration-inducing device mounted perpendicular to and circling the exterior opening (FIG. 8).

Figure 10:
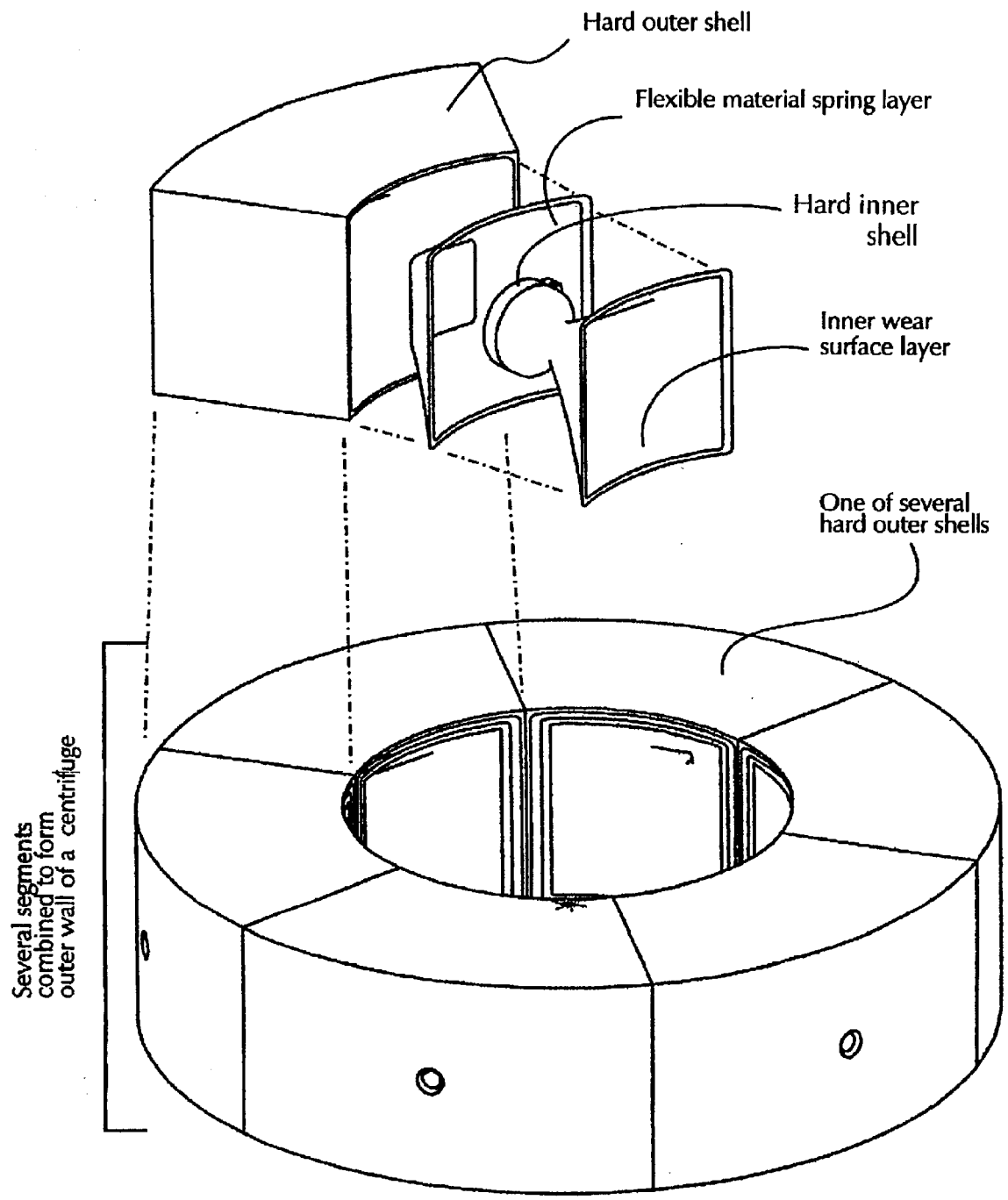

FIG. 10 Exploded perspective view of a single, three-layer receptacle and its combination with other identical segments to form a complete outer wall of a centrifugal device.

Figure 11:
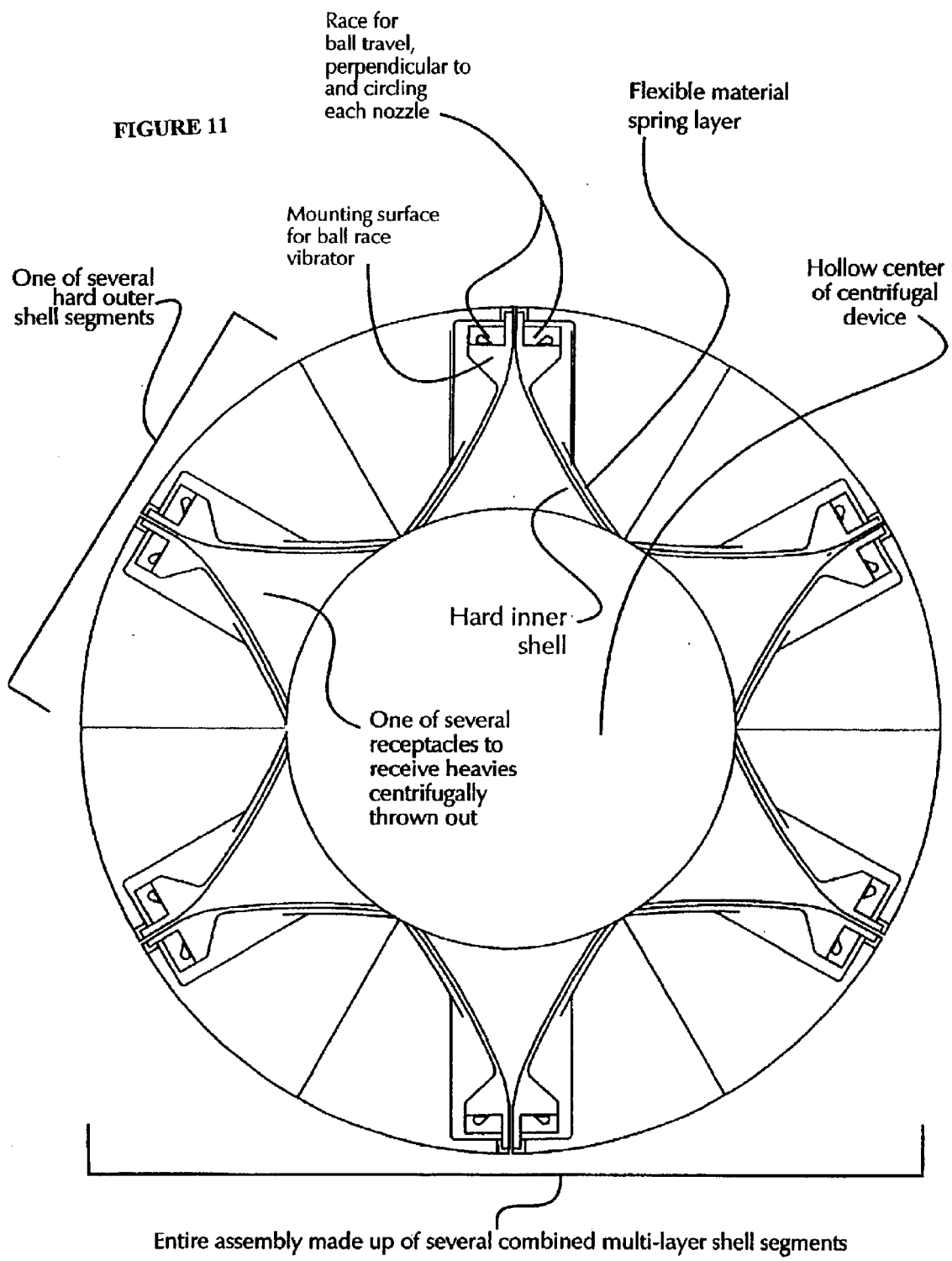

FIG. 11 Top view of multiple three-layer receptacles including a ball race vibration-inducing device mounted perpendicular to and circling the nozzle, all assembled together to form a complete outer wall of a centrifugal device.

FIG. 12 Exploded perspective and partial x-ray view of FIG. 4 through FIG. 11, plus the top cap of a centrifugal device showing the means of delivering air under pressure from a central source to some or all of multiple individual receptacles comprising the outer wall of a centrifuge, as a method of powering the movement of balls through the races perpendicular to and circling the nozzle of receptacle, and thus vibrating the inner shell wall of each receptacle.

DETAILED DESCRIPTION OF THE INVENTION

Embodiments of the use of vibration to decrease the friction along the walls of receptacles in the walls of a centrifugal device include two different vibratory paths and two locations of the means of inducing vibration such receptacles. The two vibratory paths are reciprocal, and torsional or orbital. The two different locations of the means for inducing vibration in the walls of receptacles are: (1) powered at each individual receptacle, and (2) powered by a centralized source for two or more receptacles. The following matrix of these combinations also indicates relevant drawings provided with this application.

| | Vibrational Paths | |
|---|---|---|
| | Vibration powered at each receptacle | Vibration powered at a central source for two or more receptacles |
| Reciprocating Vibration | Vibration-including device such as an electro-mechanical transducer, embedded in or on inner shell of each receptacle— Drawings 01/12 and 02/12 | Cam, rod and connector-ring assembly vibrating the nozzle of the inner shell of each receptacle— Drawing 03/12 |
| Torsional or Orbital Vibration | | Ball race attached of the nozzle of the inner shell of each receptacle, with motion of the balls in each race powered by air from a central source— Drawings 04/12 through 12/12 |

The application of vibration to the walls of receptacles surrounding a centrifugal device may be used to improve the performance and economy of solid and/or liquid separators and/or de-watering devices used in any or all of the following applications, where the term de-watering means the removal of any fluid or liquid including but not limited to "water" from a Mixture:

(a) Separation, thickening and de-watering for wastewater treatment including municipal, industry, agriculture and aquaculture (b) Separation, thickening and de-watering for bio-manufacturing (c) Separation, thickening and de-watering for food and beverage processing (d) Separation, thickening and de-watering for the chemical industry (e) Separation, thickening and de-watering for the forest product industry, including pulp and paper processing (f) Separation, thickening and de-watering for kaolin manufacture (g) Separation, thickening and de-watering for water treatment (h) Separation, thickening and de-watering for petroleum refining industry (i) Separation, thickening and de-watering for the metal casting industry (j) Separation, thickening and de-watering of sludges from waste gas scrubbing (k) Separation, thickening and de-watering of pharmaceutical products (l) Separation, thickening and de-watering for the aluminum industry (m) Separation, thickening and de-watering for the steel industry (n) Separation, thickening and de-watering for the glass industry (o) Separation, thickening and de-watering for materials processing industries

What is claimed is:

1. A method for separation or other treatment of fluids including liquids, liquid-liquid mixtures, gases, or liquid-gas mixtures and of materials contained in said fluids including solids, other particles, or gelatinous or viscous materials, comprising:

a centrifugal separator with an outer shell operable to receive a plurality of receptacles;

the centrifugal separator's outer shell having an interior and an exterior;

each receptacle having an outermost hard or rigid layer, a middle flexible and/or compressible layer and an innermost hard or rigid layer;

the innermost hard or rigid layer of each receptacle being hopper-shaped or trumpet-shaped, whose broadest open end presents to the interior of said centrifugal separator's outer shell, and whose sloping receptacle walls converge outwardly to meet at a relatively smaller opening projecting through the exterior of said centrifugal separator's outer shell;

the flexible and/or compressible middle layer of each receptacle is shaped to fit within and be loosely connected to the hard or rigid outermost layer of each receptacle;

the innermost hard or rigid innermost layer of each receptacle fits within and is loosely connected to the middle flexible and/or compressible layer of each receptacle, such that said innermost hard or rigid layer is free to be vibrated in various ways and move various directions within the flexible and loosely connected containment supplied by the middle flexible and/or compressible layer; and a means for generating or inducing vibration on, against and/or in the innermost hard or rigid layer, wherein vibratory motion thus applied to the innermost hard or rigid layers of the receptacles received on the outer shell of the centrifugal separator decreases the friction between the sloped, converging walls of the innermost hard or rigid layers of the receptacles and the materials being centrifugally thrown against those wails, such that those materials are thereby freed from sticking to the sloped, converging walls and thus can travel further outwards along the sloped, converging walls and deeper into the increasingly small volume of space presented by the sloped, converging walls, thereby applying additional physical compression to said materials due to the converging of the walls, and thus compelling additional or enhanced removal of fluid from these materials, as a means for either increasing the separation of lighter fluid from heavier fluid, or for improving the removal of additional fluid from heavier fluids resulting in their increased dryness, depending on the goal of a particular centrifugal process.

2. A centrifugal device for separation or other treatment of fluids including liquids, liquid-liquid mixtures, gases, or liquid-gas mixtures and of materials contained in said fluids including solids, other particles, or gelatinous or viscous materials, comprising:

a centrifugal separator with an outer shell operable to receive a plurality of receptacles;

the centrifugal separator's outer shell having an interior and an exterior;

each receptacle having an outermost hard or rigid layer, a middle flexible and/or compressible layer and an innermost hard or rigid layer;

the innermost hard or rigid layer of each receptacle being hopper-shaped or trumpet-shaped, whose broadest open end presents to the interior of said centrifugal separator's outer shell, and whose sloping receptacle walls converge outwardly to meet at a relatively smaller opening projecting through the exterior of said centrifugal separator's outer shell;

the flexible and/or compressible middle layer of each receptacle is shaped to fit within and be loosely connected to the hard or rigid outermost layer of each receptacle;

the innermost hard or rigid innermost layer of each receptacle fits within and is loosely connected to the middle flexible and/or compressible layer of each receptacle, such that said innermost hard or rigid layer is free to be vibrated in various ways and move various directions within the flexible and loosely connected containment supplied by the middle flexible and/or compressible layer; and a means for generating or inducing vibration on, against and/or in the innermost hard or rigid layer.

* * * * *